(12) United States Patent
Mayor

(10) Patent No.: US 9,842,581 B2
(45) Date of Patent: Dec. 12, 2017

(54) ACOUSTIC LOGGING APPARATUSES AND METHODS

(71) Applicant: Reeves Wireline Technologies Limited, Leicestershire (GB)

(72) Inventor: Terence Paul Mayor, Nottingham (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 145 days.

(21) Appl. No.: 14/570,288

(22) Filed: Dec. 15, 2014

(65) Prior Publication Data

US 2015/0170634 A1 Jun. 18, 2015

(30) Foreign Application Priority Data

Dec. 17, 2013 (GB) .................................. 1322325.0

(51) Int. Cl.
*G01V 1/40* (2006.01)
*G10K 9/12* (2006.01)
*G01V 1/02* (2006.01)

(52) U.S. Cl.
CPC ............. *G10K 9/121* (2013.01); *G01V 1/159* (2013.01); *G01V 2210/1299* (2013.01)

(58) Field of Classification Search
CPC . G01V 1/159; G01V 2210/1299; G10K 9/121
USPC .................................................. 367/83, 137
See application file for complete search history.

(56) References Cited

U.S. PATENT DOCUMENTS

| 4,649,526 A * | 3/1987 | Winbow ................... G01V 1/44 367/25 |
| 5,081,391 A | 1/1992 | Owen |
| 6,661,737 B2 * | 12/2003 | Wisniewski ............. G01V 1/44 181/103 |
| 7,369,833 B2 * | 5/2008 | Smith ...................... H01Q 3/26 375/347 |
| 2010/0202252 A1 | 8/2010 | Ounadjela et al. |

OTHER PUBLICATIONS

Search Report received in corresponding Great Britain application No. GB1322325.0, dated Mar. 18, 2014, 3 pages.

* cited by examiner

*Primary Examiner* — Daniel L Murphy
(74) *Attorney, Agent, or Firm* — Blank Rome LLP

(57) ABSTRACT

A transmitter for an acoustic logging tool includes an elongated housing, an acoustic energy generator, and a driver. The elongate housing defines a hollow interior and supports an acoustic energy generator, which includes four mutually orthogonally orientated bender bars that are electrically driveable to flex within the hollow interior in order to generate pressure-derived waves in a fluid surrounding the transmitter in use. The housing includes one or more transmissive windows via which flexing of the bender bars gives rise to propagation of one or more said waves in a said fluid. The driver electrically drives the bender bars to flex so as selectively to generate monopole, dipole, or quadrupole waves in a said fluid, with the poles of the dipole and quadrupole when generated selectively being aligned with normals to pairs of the bender bars or rotated 45° relative thereto.

21 Claims, 13 Drawing Sheets

ACOUSTIC LOGGING APPARATUSES AND METHODS

BACKGROUND OF THE DISCLOSURE

The invention relates to acoustic logging apparatuses and methods. Such apparatuses and methods are sometimes also referred to using the adjective "sonic", although the term "acoustic" is preferentially used herein for convenience.

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above both before mineral extraction activities commence and also, increasingly frequently, while they are taking place.

Broadly stated, logging involves inserting a logging tool including an energy generating section sometimes called a "sonde" into a borehole or other feature penetrating a formation under investigation; and using the sonde to energise the material of the rock, etc, surrounding the borehole in some way. The sonde or another tool associated with it that is capable of detecting energy is intended then to receive emitted energy that has passed through the various components in the rock before being recorded by the logging tool.

Such passage of the energy alters its character. Knowledge of the attributes of the emitted energy and that detected after passage through the rock may reveal considerable information about the chemistry, concentration, quantity and a host of other characteristics of minerals in the vicinity of the borehole, as well as geological aspects that influence the ease with which the target mineral material may be extracted to a surface location.

Logging techniques are employed throughout the mining industry; in the identification of subterranean sources of water; and also in particular in the oil and gas industries. The invention is of benefit in logging activities potentially in all such kinds of investigation, and especially in the logging of reserves of oil and gas.

In the logging of oil and gas fields (including fields combined with rock types such as shales or coal beds) specific problems can arise. Broadly stated this is because it is necessary to consider a geological formation that typically is porous and that contains a hydrocarbon-containing fluid such as oil or gas or (commonly) a mixture of fluids only one component of which is of commercial value.

Moreover for example stratification of rock, micro-cracking and the effects of applied stress often give rise to anisotropic characteristics that adversely affect the ease with which log data can be interpreted. Such phenomena are widely reported in the technical literature pertaining to logging activity.

These factors lead to various complications associated with determining physical and chemical attributes of the oil or gas field in question. In consequence a wide variety of logging methods has been developed over the years. The logging techniques exploit physical and chemical properties of a formation usually through the use of an elongate logging tool or sonde that is lowered into a borehole (that typically is, but need not be, a wellbore) formed in the formation by drilling. Sometimes the term "logging toolstring" is used to refer to logging tools made up of a series of elongate subcomponents that are joined end to end to create a tool providing a chosen combination of performance features.

The tool or toolstring typically is conveyed to a downhole location (the terms "downhole" and "uphole" being familiar to the person of skill in the art) suspended on wireline or supported on drillpipe. The nature and operation of wireline and drillpipe for these purposes, and the use of wireline for the transmission of log data to a surface location, are well known in the data logging arts.

Typically, as noted, once the tool reaches a location at which logging is to occur it sends energy into the formation on demand and detects the energy returned to it that has been altered in some way by the formation. The nature of any such alteration can be processed into electrical signals that are then used to generate logs (i.e. graphical or tabular representations containing much data about the formation in question).

Conventionally logging takes place by conveying the logging tool to a downhole location and then withdrawing it upwardly while logging takes place. However it is also known to carry out logging activity while a borehole is being drilled. Such techniques are known as "logging while drilling" or "LWD" activities. The invention relates generally to conventional logging sequences and LWD methods.

One form of logging technique is known as acoustic logging. As the name implies, in acoustic logging, acoustic (i.e. mechanical fluid wave) energy is generated by the logging tool and transmitted into the rock surrounding a borehole. The energy returned to the tool after passing through the rock is detected by one or more acoustic energy detectors sometimes referred to as hydrophones.

In a typical acoustic dipole logging tool the sonde section is hollow and contains a pair of centrally mounted bender bars secured seriatim in the tool. The bender bars include piezoelectric elements that may be energized under the influence of a control circuit to cause them to deflect in opposite directions and thereby generate a dipole wave (or pressure pattern) in fluid surrounding the tool in the borehole. Depending on the relative speeds of propagation of the wave in the rock and the fluid the wave energy may be caused to penetrate the rock and thereby travel through it before being detected by a set of (typically) four mutually orthogonal hydrophones that are secured in the logging tool, in use vertically above the bender bar.

A sonde section used in this manner includes apertures on opposite sides of the housing, in register with the bender bars. These permit energy resulting from deflection of the bender bars to create the desired pressure pattern in the borehole fluid surrounding the sonde, and therefore generate the required flexural wave energy in the borehole-formation system. As is known to the person of skill in the art, a dipole wave (or pressure pattern) in a borehole gives rise to a dipolar displacement which is flexural in nature.

A sleeve typically surrounds the housing in a fluid-tight manner. The hollow interior of the sonde in addition to mounting the bender bars contains an oil. The combination of the movement of the bender bars and the characteristics of the oil cause propagation of the wave in the fluid. The sleeve is therefore sufficiently flexible (or flexibly secured) and light as to be transmissive of the energy of the wave. The sleeve may be made from a range of materials that do not attenuate the generated wave.

The constructional principles of a prior art acoustic logging transmitter 10 are shown in a highly schematic, three dimensional view in FIG. 1.

In FIG. 1 a piezoelectric bender bar 11 is shown captured between two relatively rigid end masses 12, 13 that may be for example end caps retained within a housing defining the transmitter 10.

The bender bar 11 adopts an elongate, rectangular form that at each end is secured to a respective said end mass 12, 13 via a hinge represented schematically by numeral 14. The bender bar extends longitudinally along the length of the transmitter, that typically is a so-called "sub" or a section of a logging tool that is assembled from a series of subs that are secured together end to end, as is well known in the logging art.

Each hinge 14 may be formed by a pivoted linkage arrangement or, for instance, a flexible part of the bender bar or a flexible intermediate element joining the bender bar 11 and the end masses 12, 13. The purpose of the hinges 14 is to permit the bender bar 11 to flex relative to the end masses, and also accommodate its characteristic shortening, when the bender bar is energized through the application of an electrical voltage generated in a driver circuit.

The bender bar may be formed as e.g. two rectangular layers or plates of piezoelectric material respectively extending along and bonded to either side of a central rectangular neutral plate. This is sometimes referred to as a trilaminar construction. The neutral plate is capable of flexing to adapt to flexed configurations of the piezoelectric plates. Its ends extend beyond the ends of the piezoelectric plates, and are secured to the hinges 14.

Connections permit the application of voltages generated by the driver circuit to the piezoelectric plates. As is well known the application of a voltage to a plate of piezoelectric material changes its dimensions while the voltage is applied. By applying differential voltages to the respective piezoelectric plates on opposite sides of the neutral plate one may cause the entire bender bar to flex along its length and thereby adopt a curved configuration.

The result of this arrangement is that on the application of appropriate voltages the bender bar flexes relative to the end masses 12, 13 with the hinges 14 accommodating both the lateral movement and the reduction in the distance between the ends of the bender bar occasioned by its flexing. The principal movement of the bender bar is signified by the double-headed arrow in FIG. 1.

The transmitter 10 normally would include an outer cylindrical sleeve encircling the bender bar arrangement. The sleeve, that is omitted from FIG. 1 because of the schematic nature of this illustration, is filled with an oil. Structural parts of the transmitter include one or more windows that are transmissive to pressure waves and pulses while the sleeve prevents egress of the oil. The controlled application of voltages to the piezoelectric plates forming the bender bar therefore creates pressure patterns in the oil that may be transmitted to borehole fluid surrounding the transmitter 10 via the windows. The driver circuit may be programmed to cause the generation of desired sequences of pressure pulses in the borehole fluid.

In a practical transmitter there would exist more than one of the bender bars, arranged inside the housing in a manner that gives rise to chosen pressure patterns in the borehole fluid. The housing may include plural numbers of appropriately designed and located windows that permit the propagation of the pressure patterns in the borehole fluid.

The driver circuit includes or is connected to a programmable device that typically causes one, or in some constructions two, bender bars inside the housing simultaneously to bend in opposite directions. As a result for example, a positive pressure pulse emanates via one of the windows in the housing and a negative pressure emanates via an oppositely located window in turn resulting in a characteristic dipole directivity. In consequence a symmetrical dipole pressure pulse may be generated. Oscillatory activation of two bender bars in the transmitter in this manner gives rise to a desired flexural wave that can be used to energise a formation surrounding the transmitter for logging purposes.

In practical logging tools two of the transmitter sections 10 may be joined seriatim in a logging toolstring. The windows of the respective transmitters are orientated orthogonally to one another so that two orthogonal dipoles may be generated.

Such an approach is useful for example when the formation exhibits shear anisotropy, a well-known phenomenon in which shear waves become polarized into components propagating respectively parallel to and perpendicular to the fast and slow velocity principle axes, e.g. the prevailing lines of fracture in the rock. The wave component propagating parallel to the fracture direction has a higher velocity in the rock than the wave component propagating perpendicular to the fracture.

It is sometimes desirable to co-locate the transmitters at a common depth in the borehole instead of at different, albeit adjacent, depths as described. This eliminates some problems associated with depth-matching the signals generated at the hydrophones (and that are used to generate the acoustic logs) with the depths at which the acoustic waves are generated, particularly when the downhole tools suffer from a phenomenon known as stick-slip. Certain known designs of transmitter address this aspect.

These known designs of dipole acoustic transmitter however are of limited benefit because the orthogonally directed pair of dipole pressure patterns they generate emanate at fixed orientations relative to the borehole.

This is often a disadvantage because it is difficult to control the orientation of the logging tool relative to the borehole. If the logging tool is orientated such that (for example) the pressure dipoles do not impinge along the principal axes of the borehole, excitation of dipole modes may diminish at the expense of unwanted excitation of a monopole (Stoneley) mode. In such circumstances even if the logging engineer is aware of a problem it could be completely impossible to take remedial steps. As a result valuable logging time could be wasted.

This can be a noticeable problem if the logging tool is "eccentered" in a borehole. In this condition the longitudinal central axis of the logging tool fails to coincide with the central longitudinal axis of the borehole. This is sometimes the case when the borehole extends horizontally, or substantially horizontally. In such a situation the logging tool tends to settle off-centre on the low side of the borehole. As a result the tool axis and the borehole axis in general are not coincident.

Eccentering of a logging tool can also arise in boreholes that do not extend predominantly horizontally; but it is encountered most commonly, and is hardest to remedy through attempting to reposition the logging tool, in substantially horizontal boreholes.

Eccentering is illustrated in FIG. 2a, which shows in transverse cross sectional view a horizontal borehole 16 in which a logging tool 10 has settled on the low side 17, opposite the high side 18, of the borehole.

In such a situation in order to minimize the effects of the eccentering problem ideally the poles X, Y of the dipoles should align respectively along the diameter 19 of the borehole containing the logging tool and along a chord 21 orthogonal thereto, in order to maximize the flexural mode excitation in the formation. As noted however in practice this can be hard or even impossible to achieve.

This is typically because the orientation of the tool 10 relative to the borehole means that the dipole axes X, Y are rarely aligned with the diameter and chord as desired. It moreover is not often possible to rotate the logging tool in the borehole in order to achieve the preferred orientation described above. This mis-alignment of the dipole axes is shown in FIG. 2a.

A further characteristic of existing acoustic transmitters as known in the prior art is that when used to generate monopole pressure patterns their usefulness is limited. This is because the known designs based on piezoelectric hoops are not capable of generating monopole frequencies with significant energy below the approximate frequency range 12 KHz-25 KHz. This is particularly the case when the tool diameter is small. It is however desirable to generate lower monopole frequencies in some situations as described further herein.

U.S. Pat. No. 5,081,391 discloses an acoustic transducer in which four piezoelectric elements are bonded to four quadrants defined on the interior of a flexible cylindrical shell, such that opposed pairs of the piezoelectric elements lie on one or other of two mutually orthogonal axes extending transversely of the shell. The publication discloses driving the piezoelectric elements in order to generate dipole pressure patterns in a surrounding fluid.

In one embodiment U.S. Pat. No. 5,081,391 describes multiple piezoelectric elements bonded at regular intervals about the interior of the cylindrical shell. By selectively driving the elements multi-pole pressure patterns can be generated orientated at a plurality of fixed locations about the cylinder. The fact that the piezoelectric elements are bonded to the cylindrical shell however is stated in U.S. Pat. No. 5,081,391 adversely to influence efficiency of the transducer in this mode.

"*A New Generation Crossed Dipole Logging Tool: Design and Case Histories*", Kessler et al, SPWLA 42nd Annual Logging Symposium, Jun. 17-20 2001, discloses a monopole and two dipole piezoelectric acoustic transmitters in a transducer body. The firing sequence of the transmitters is programmable.

WO 2010/091160 A2 discloses another cylindrical quadrant piezoelectric transducer design in which pressure pattern axes are generated a fixed orientations relative to the cylinder.

Further publications pertaining generally to acoustic transmitter design include U.S. Pat. Nos. 7,207,397, 7,460, 435, 5,477,101, 4,525,645, 7,364,007, 5,109,698, 6,614,360 and 8,199,609.

SUMMARY OF THE INVENTION

According to the invention in a first broad aspect there is provided a transmitter for an acoustic logging tool, the transmitter comprising:
a) a housing defining a hollow, oil-filled interior and supporting an acoustic energy generator, the acoustic energy generator including
b) four mutually orthogonally orientated bender bars that are electrically driveable to flex within the hollow interior in order to generate pressure patterns in a fluid surrounding the transmitter in use, the elongate housing including
c) one or more transmissive windows via which flexing of the bender bars gives rise to propagation of one or more said pressure patterns in a said fluid, the transmitter further comprising
d) a driver that applies voltages to the bender bars in order independently electrically to drive them to flex so as selectively to generate monopole or multi-pole pressure patterns in a said fluid, with the poles of the multi-pole pressure patterns when generated selectively being aligned with normals to oppositely disposed pairs of the bender bars, or rotated at angles thereto depending on the voltages applied to the bender bars by the driver.

An advantage of this design of transmitter is that it confers flexibility on the choice of waveform type and orientation, thereby improving the ease with which for example an eccentered logging tool may be used in anisotropic formations as described. Furthermore the flexibility improvement referred to arises without any need to increase the number of hydrophones in the receiver section of the logging tool or toolstring in which the transmitter of the invention is used.

A further advantage is that the orthogonal bender bars of the transmitter of the invention may readily be co-located as to depth.

Thus the redundancy of the log data are significantly improved with only a minimal penalty in terms of additional processing time occasioned by the possibility of processing a greater number of log data channels than in the prior art. Furthermore the degree of redundancy is adjustable or programmable at the option of an operator.

For the avoidance of doubt, although embodiments of the invention are described herein with reference to a trilaminar bender bar construction, it is believed that so-called monomorph and bimorph bender bars are also viable. Such variants lie within the scope of the invention.

The transmitter of the invention may be configured or controlled to generate monopole, dipole or quadrupole pressure patterns in a said fluid.

An advantage of the invention when the transmitter is configured to generate a monopole pressure pattern is that the frequency of the monopole wave may be controlled to be lower than the prior art range indicated above. This is advantageous when investigating Stoneley and very low velocity formations. The nature of formations that give rise to Stoneley waves, and the concept of the velocity of propagation of a wave in a formation, have been extensively investigated and widely reported in the prior art. These terms therefore are readily understood by the person of skill in the art.

The transmitter of the invention moreover may be configured or controlled to cause the poles of the dipole or quadrupole pressure patterns to be rotated at 45° to normals to oppositely disposed pairs of the bender bars.

The 45° rotation represents a specific case of a more general ability, described herein, to rotate the poles of the transmitter.

Preferably the housing is elongate; the or each said transmissive window is elongate; and the direction of elongation of the or each transmissive window is aligned with the direction of elongation of the housing. The housing is such as to retain the oil inside the transmitter, notwithstanding the ability of the transmissive windows to permit transmission of the pressure patterns externally of the transmitter.

Conveniently the transmitter of the invention includes four transmissive windows each respectively in register with a said bender bar. However in other embodiments of the invention other numbers of the windows may be used, it being necessary essentially that the bender bars are aligned with the windows such that propagation of the desired waveforms outside the transmitter takes place efficiently.

In preferred embodiments of the invention each bender bar includes a pair of elongate piezoelectric plates extending respectively along and secured to opposite sides of a hinge plate, the hinge plate extending beyond the piezoelectric plates in the direction of elongation thereof and being secured beyond the piezoelectric plates to opposed edges of a said transmissive window.

It is also preferable that the piezoelectric plates of each bender bar are at least nearly identical to one another and are secured in register with one another on opposite sides of a said hinge plate. However, small differences in sensitivity (defined herein as deflection per volt applied to each bender bar) can be compensated for by alteration of the voltages applied to each bender bar. The driver may include circuitry and/or programmable components that give effect to this possibility.

Optionally, different bender bar constructions than that described, as would occur to the person of skill in the art, alternatively could be employed in the transmitter of the invention.

Preferably the bender bars define a square pattern when the transmitter is viewed in transverse cross-section.

Conveniently the transmitter includes secured at each end of the housing an end cap. Preferably a said end cap that in use lies uphole of the acoustic energy generator includes secured thereto an acoustic isolator.

Various designs of acoustic isolator are known in the logging tool art and are suitable for use in the transmitter of the invention. Clearly when as is commonly the case the transmitter is secured in a toolstring including hydrophones it is essential that there is no direct acoustic transmission path between the transmitter and the hydrophones via the toolstring itself since energy so transmitted would contain no geological information One preferred design of isolator, of several possible designs, is illustrated herein.

In practical preferred arrangements in accordance with the invention the transmitter includes overlying the or each transmissive window a sealing sleeve that permits the transmission of acoustic energy externally of the transmitter and fluidically isolates the interior of the housing and the internal recesses from the exterior of the transmitter.

Such a sealing sleeve therefore may be designed to "float" relative to the remainder of the transmitter in a per se known manner.

Preferred embodiments of the invention include one or more programmable devices forming part of or operatively connected to the driver whereby to control the waveform generated in use of the transmitter. Thus the driving modes of the transmitter may be altered according to the requirements of the logging engineer or scientist.

In addition to the foregoing the invention resides in an elongate logging toolstring including secured therein a transmitter according to the invention as defined herein and spaced from the energy generator along the toolstring in an in-use uphole direction four mutually orthogonally orientated acoustic energy detectors.

According to a further aspect of the invention there is provided a method of operating a transmitter according to the invention as defined herein and/or of a toolstring according to the invention as defined herein including the steps of:

e) operating the driver to cause simultaneous outward flexing of the four bender bars relative to the hollow interior of the housing in order to generate a monopole pressure pattern.

In another aspect according to the invention there is provided a method of operating a transmitter according to the invention as defined herein and/or of a toolstring according to the invention as defined herein including the steps of:

f) operating the driver to cause simultaneous flexing of two said bender bars lying opposite one another in the transmitter on a first common axis, one said bender bar being flexed outwardly relative to the hollow interior of the housing and the other said bender bar being flexed inwardly relative to the hollow interior of the housing in order to generate a dipole wave the poles of which are aligned with the common axis.

For the avoidance of doubt during Step f. defined above preferably two said bender bars lying opposite one another in the transmitter on a second common axis that differs from the first common axis remain un-flexed during generation of the dipole wave/pressure pattern.

According to yet a further aspect of the invention there is provided a method of operating a transmitter according to the invention as defined herein and/or of a toolstring according to the invention as defined herein including the steps of:

g) operating the driver to cause simultaneous flexing of two said bender bars lying opposite one another in the transmitter on a first common axis, one said bender bar being flexed outwardly relative to the hollow interior of the housing and the other said bender bar being flexed inwardly relative to the hollow interior of the housing and operating the driver to cause simultaneous flexing of two said bender bars lying opposite one another in the transmitter on a second common axis, one said bender bar being flexed outwardly relative to the hollow interior of the housing and the other said bender bar being flexed inwardly relative to the hollow interior of the housing in order to generate a dual dipole wave (as defined herein), the poles of which are 45° out of phase with the common axes.

The term "dual dipole" refers to an arrangement in which two dipole pressure patterns are in effect superimposed one on another such that the pole axes of the dipoles are not aligned with one another. The poles could be mis-aligned by any angle, depending on the voltages applied to the bender bars. If the degree of mis-alignment is other than 90° the result is a new kind of pressure pattern, described in more detail herein, that is believed not to have been reported in the prior art.

The 45° misalignment of the poles referred to above relative to normals to the bender bars may be considered as a special case of a more general form of dual dipole phenomenon that is available using the apparatus of the invention. To this end therefore the invention also includes a method of operating a transmitter as defined herein and/or the transmitter of a toolstring as defined herein including the steps of operating the driver to cause simultaneous flexing of a first pair of said bender bars lying opposite one another in the transmitter, one said bender bar of the first pair being flexed outwardly relative to the hollow interior of the housing and the other said bender bar of the first pair being flexed inwardly relative to the hollow interior of the housing and operating the driver to cause simultaneous flexing of a second pair of said bender bars lying opposite one another in the transmitter on a second common axis, one said bender bar of the further pair being flexed outwardly relative to the hollow interior of the housing and the other said bender bar of the further pair being flexed inwardly relative to the hollow interior of the housing, wherein the bender bars of the first pair are driven to flex to essentially the same first extent and the bender bars of the second pair are driven to flex to essentially the same second extent that differs from the first extent in order to generate a dual dipole wave the poles of which are rotated relative to common axes interconnecting respectively the bender bars of the first pair and the bender bars of the second pair.

This method results in a dipole pressure pattern the axes of the poles of which are rotated by any desired angle of rotation relative to a datum, as determined by the voltages applied to the bender bars of the transmitter.

Preferably the driver causes flexing of the bender bars of the first pair to an extent relative to the extent to which the driver causes flexing of the bender bars of the second pair that is selected from the following ratios:

0:20; 10:20; 15:20; 20:20; 20:15; 20:10; 20:0.

These ratios have been found useful in creating dual dipole pressure patterns the angular mis-alignment of the poles of which are beneficial in certain logging situations. However other voltage ratios may be used to generate other amounts of rotational mis-alignment as desired.

Further preferably the method of the invention includes the step of stepwise or continuously varying the ratio of the extent of flexing of the first pair of bender bars relative to the extent of flexing of the second pair of bender bars whereby to cause adjustment of the degree of mis-alignment of the poles of the dipoles of a dual dipole pressure pattern.

Thus if desired it is possible to cause the poles of a dual dipole pressure pattern to be rotationally spaced from one another about a rotation axis defined as the crossing point of the pole axes by any chosen angle between zero and ninety degrees.

It is further preferable that the values of the elements of the respective ratios referred to above correspond to voltages applied by the driver to the bender bars of respectively the first and the second pair in seven (in the preferred embodiment of the invention) different modes of operation of the transmitter or the logging toolstring as appropriate. Other intermediate modes may also be generated if desired.

In yet another aspect according to the invention there is provided a method of operating a transmitter according to the invention as defined herein and/or of a toolstring according to the invention as defined herein including the steps of:

h) operating the driver to cause flexing of a single said bender bar.

Overall as noted the invention confers considerable flexibility on the number and combination of waveforms that can be generated using an acoustic transmitter.

In addition to the foregoing the invention also resides in log data generated in accordance with or by a method as defined above.

BRIEF DESCRIPTION OF THE DRAWINGS

There now follows a description of preferred embodiments of the invention, by way of non-limiting example, with reference being made to the accompanying drawings in which.

DETAILED DESCRIPTION

Figure 3:
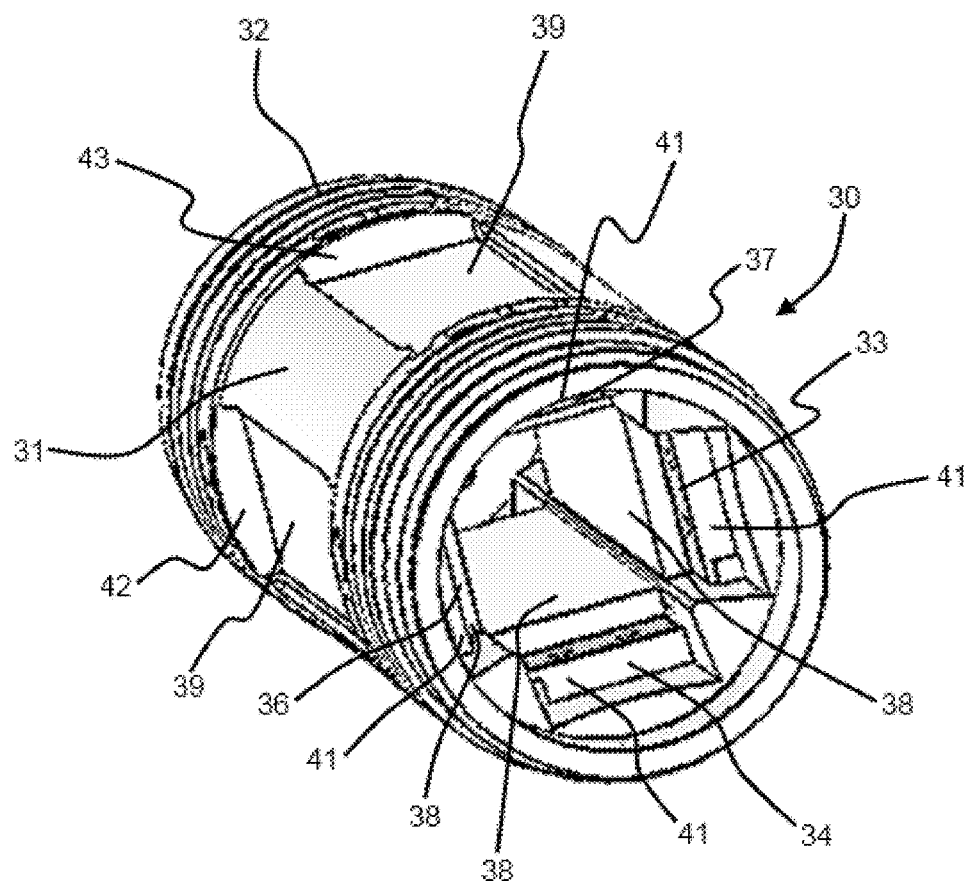
FIG. 3 is cross-sectional, partially cut-away perspective view of a transmitter according to the invention.

Referring to FIG. 3 there is shown a transmitter "sub" (i.e. toolstring subcomponent) or sonde 30 in accordance with the invention.

In FIG. 3 an elongate, hollow, cylindrical housing 31 performs similar functions to those of the housing described above in relation to the prior art; and is closed at each end by end caps of which one, 32, is visible in FIG. 3. The housing is capable of "floating" relative to the remainder of the sonde in order to promote pressure pulse generation in the borehole fluid.

In the precise arrangement of the FIG. 3 tool there may as illustrated exist a fixing arrangement, for the end caps, as would occur to the person of skill in the art.

Part of the space inside the housing in the FIG. 3 arrangement is taken up by an arrangement of four bender bars 33, 34, 36, 37 described below.

Figure 1:
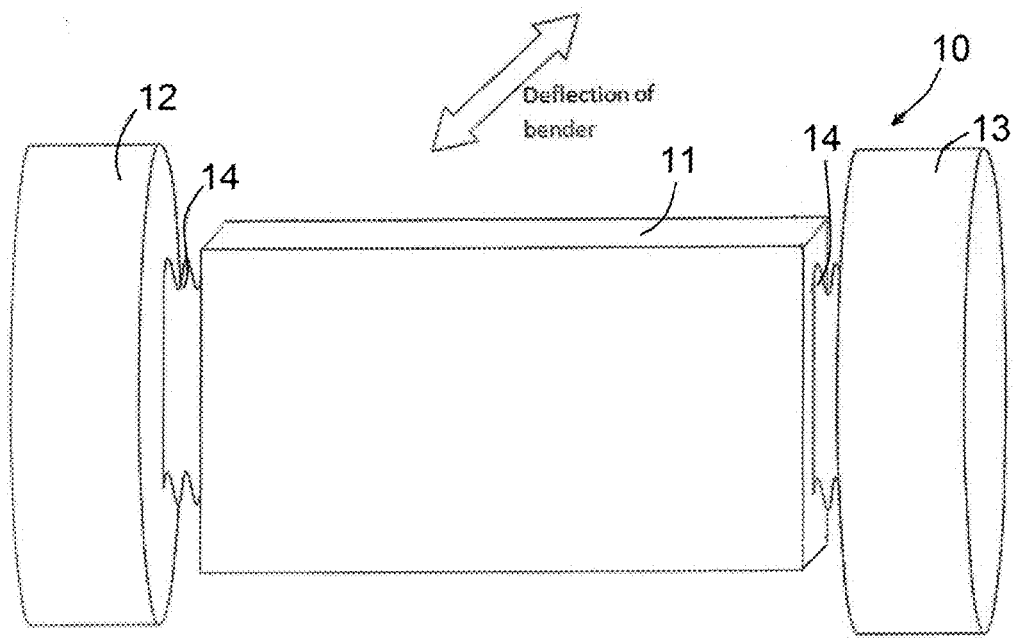
FIG. 1 is a cross-sectional, partially cut-away perspective view of a prior art acoustic transmitter.

Each of the bender bars 33, 34, 36, 37 is of essentially the same design as those described in relation to FIG. 1. Thus each bender bar consists of inner and outer rectangular piezoelectric plates 38, 39 between which extends and is secured a rectangular neutral or hinge plate 41.

In each case the hinge plate 41 extends in its elongate direction, which is aligned with that of the in-register piezoelectric plates 38, 39, beyond the ends of the piezoelectric plates. This permits anchoring of the ends of the bender bars relative to the housing and end caps in a similar manner to that described in relation to FIG. 1.

As is evident from FIG. 3 the four bender bars are arranged parallel to one another inside the housing in a mutually orthogonal pattern that is square when viewed end-on or in cross-section. Thus the corners of the square pattern are defined by the longitudinal edges of adjacent bender bars 33, 34, 36, 37.

A subsidiary feature of the arrangement of the invention therefore is that the bender bars are co-located depth-wise in the transmitter. This obviates a need for certain depth compensations that may otherwise be required in use.

Using the mutually orthogonal pattern of bender bars illustrated furthermore allows an arrangement that will readily fit inside a so-called "small diameter" cylindrical logging tool, the exterior diameter of which is in one known example approximately 57 mm (2 ¼ inches).

As described below the arrangement of bender bars when driven by an appropriate driver can give rise to a range of pressure waveforms in fluid (such as but not limited to drilling fluid or another fluid intentionally or otherwise introduced into the borehole containing the transmitter in use) surrounding the transmitter that have not been available in the prior art.

In view of the arrangement of the bender bars 33, 34, 36, 37 a particular arrangement of pressure-transmitting windows is required that differs from prior art window patterns. In the transmitter 30 of FIG. 3 there are provided four windows arranged in a mutually orthogonal pattern matching that of the bender bars 33, 34, 36, 37. Two of the windows, labelled 42 and 43, are visible in FIG. 3. Counterpart windows are formed in the opposite sides of the housing to visible windows 42 and 43.

When covered by a floating sleeve of the kind already described herein the windows permit pressure pattern generation and propagation in the fluid surrounding the transmitter 30 in use.

The shapes and positioning of the windows formed in housing 31 are such as to maximize the conversion of energy applied to the piezoelectric plates 38, 39 of each bender bar into waves in the surrounding fluid.

The bender bars are each driven by a driver circuit that may be located inside the housing 31 or may form part of e.g. another sub in a toolstring of which transmitter 30 forms part. The transmitter may include one driver circuit or plural driver circuits, depending on the precise design.

The driver circuit(s) may be connected to or may include a programmable device the purpose of which is to provide for adjustment of the driver signal voltages applied to the bender bars in accordance with design and operational requirements. Alternatively in simple forms of the invention a non-programmable circuit may be provided that gives rise to a limited range of driver waveforms.

As noted below however the transmitter of the invention is capable of being driven in a variety of wave modes so it is desirable that any driver circuit at least is switchable for the purpose of selecting chosen driver modes.

Figure 4:
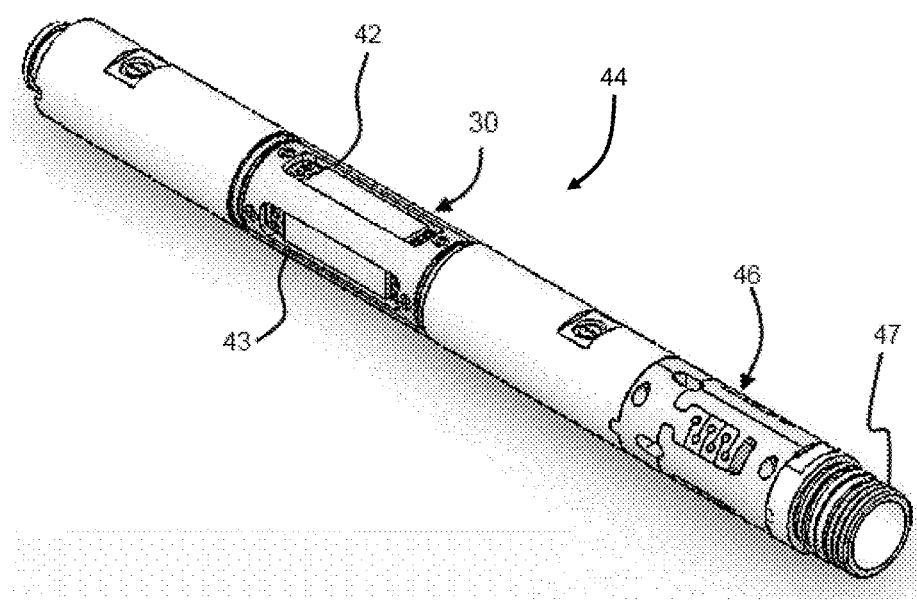
FIG. 4 is a perspective view of a logging toolstring according to the invention.

As best illustrated in FIG. 4 the transmitter 30 typically is assembled as a sub, using per se known connection techniques, as part of a logging toolstring 44 as illustrated in FIG. 4.

Also as shown in FIG. 4 the transmitter 30 is separated by an acoustic isolator section 46, that forms part of the isolator sub, that also may be of a known design by one or more intermediate subs that may have a range of functions.

The acoustic isolator prevents the direct transmission of acoustic energy uphole from the transmitter 30 via the material of the toolstring 44 to a receiver sub that is in use secured beyond the end of the isolator sub 46 e.g. by way of a conventional threaded pin end that is receivable in a box end of another sub, or by another fastening means (the terms "pin" and "box" as used herein having their conventional meanings known in the oil and gas arts).

In FIG. 4 the transmitter 30 is again shown omitting its floating external sealing sleeve that is normally present and that confers a plain external appearance on the transmitter 30 in use.

Figure 5:
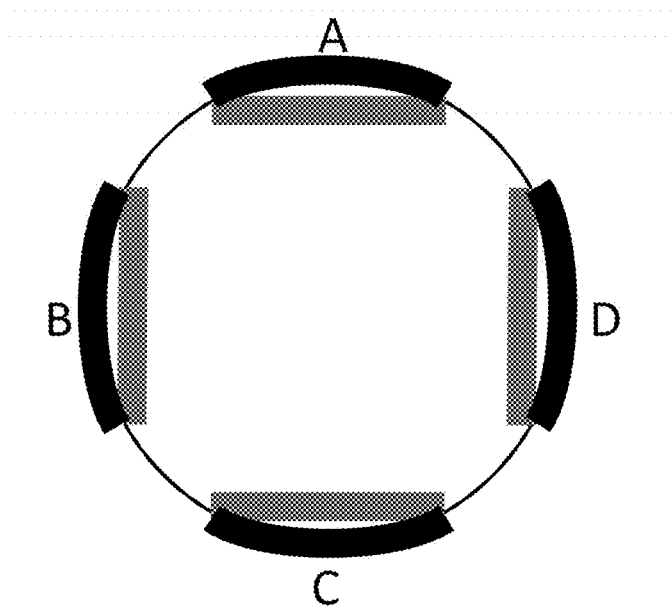
FIG. 5 is a schematic illustration of method steps according to the invention that result in generation of a monopole wave.

FIG. 5 illustrates in schematic form the driving of the bender bars of the transmitter of the invention in order to generate a monopole wave in the borehole fluid.

In FIG. 5 the schematically illustrated bender bars are labelled A, B, C and D in order to simplify the explanation of the driver logic. In FIG. 5 (and also in subsequently described FIGS. 7, 8 and 10) the lightly shaded bender bar images illustrate the un-energised condition and the darkly shaded bender bar images the energised condition as driven by the driver circuit. The driver circuit may through choosing the driver voltage polarities cause the bender bars to flex inwardly or outwardly, as desired, relative to the housing 31 of the transmitter 30.

As shown a monopole wave may be generated by simultaneously driving opposite pairs (A+C) and (B+D) of the bender bars outwardly in opposite directions. As a result all four bender bars A, B, C and D are driven outwardly and this results in a monopole pressure pattern that is as illustrated in FIG. 6.

Figure 6:
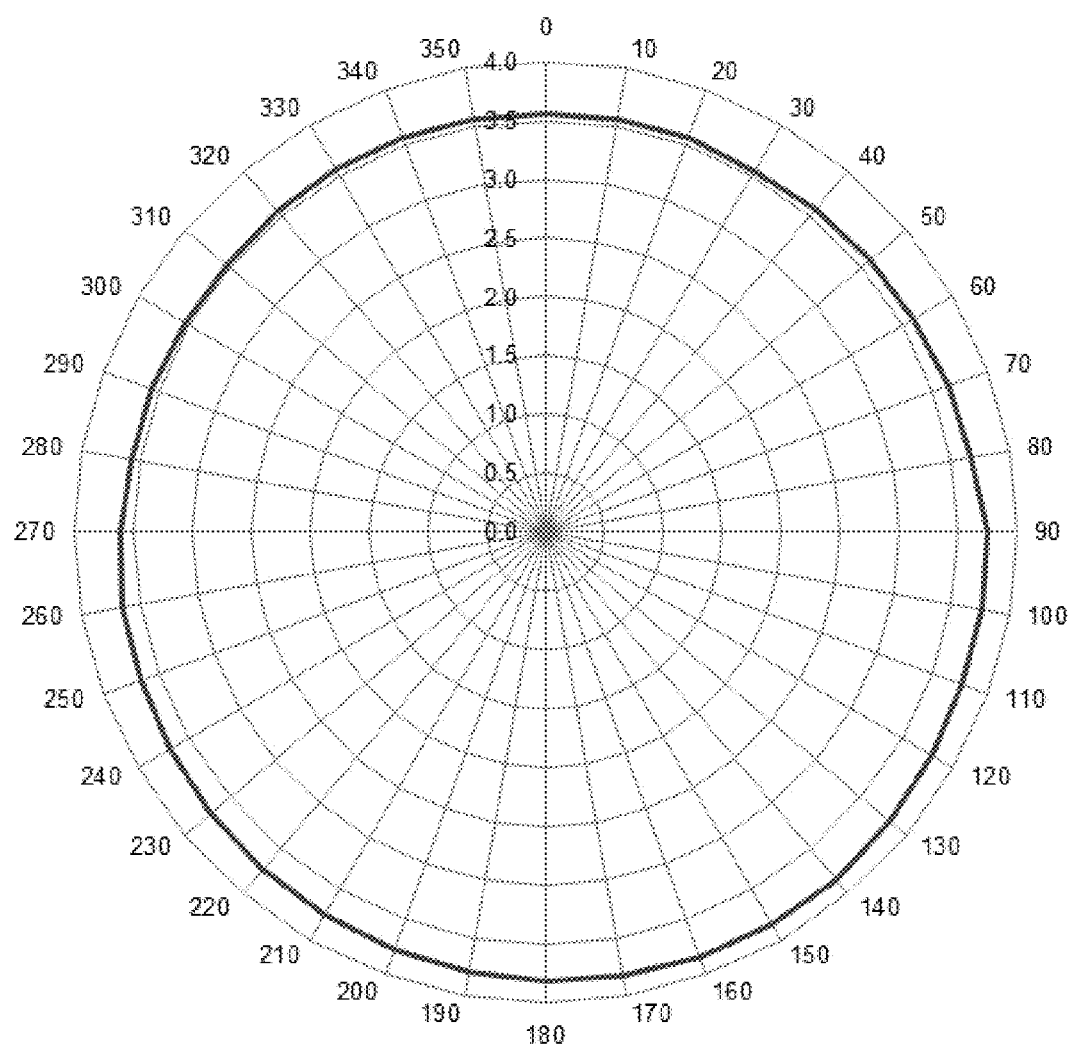
FIG. 6 is a plot of the amplitude of the wave generated as a result of the method of FIG. 5 relative to the cross-section of the transmitter, showing the directivity of the wave.

FIG. 6 shows the monopole wave amplitude plotted against angular position measured with reference to the cylindrical circumference of the transmitter 30. As indicated by FIG. 6 the directivity pattern desirably is of essentially uniform intensity all around the transmitter.

As noted above the monopole may through use of the transmitter of the invention be generated in a considerably lower frequency range than has been available in a prior art hoop transmitter of equivalent diameter. This gives rise to advantages when logging certain kinds of formation.

Figure 7:
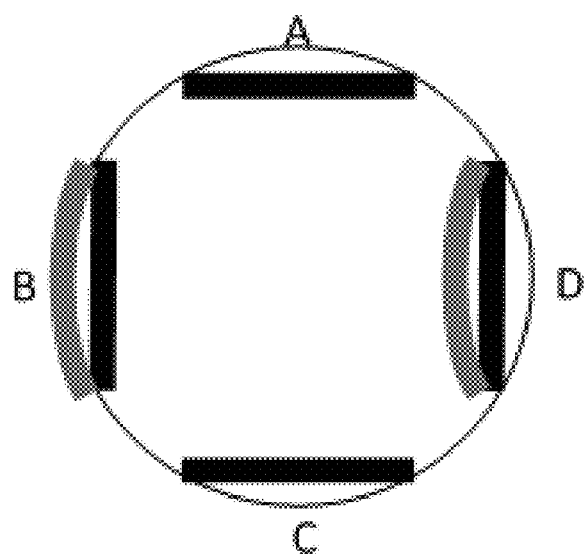
FIG. 7 is a view similar to FIG. 5 showing method steps that result in generation of a dipole wave.

FIG. 7 illustrates operation of the driver to generate a dipole pressure pattern.

In the illustrated embodiment bender bars A and C are undriven and remain unflexed. Bender bar B is driven outwardly and bender bar D is driven inwardly relative to the circumference of the transmitter 30.

Figure 9:
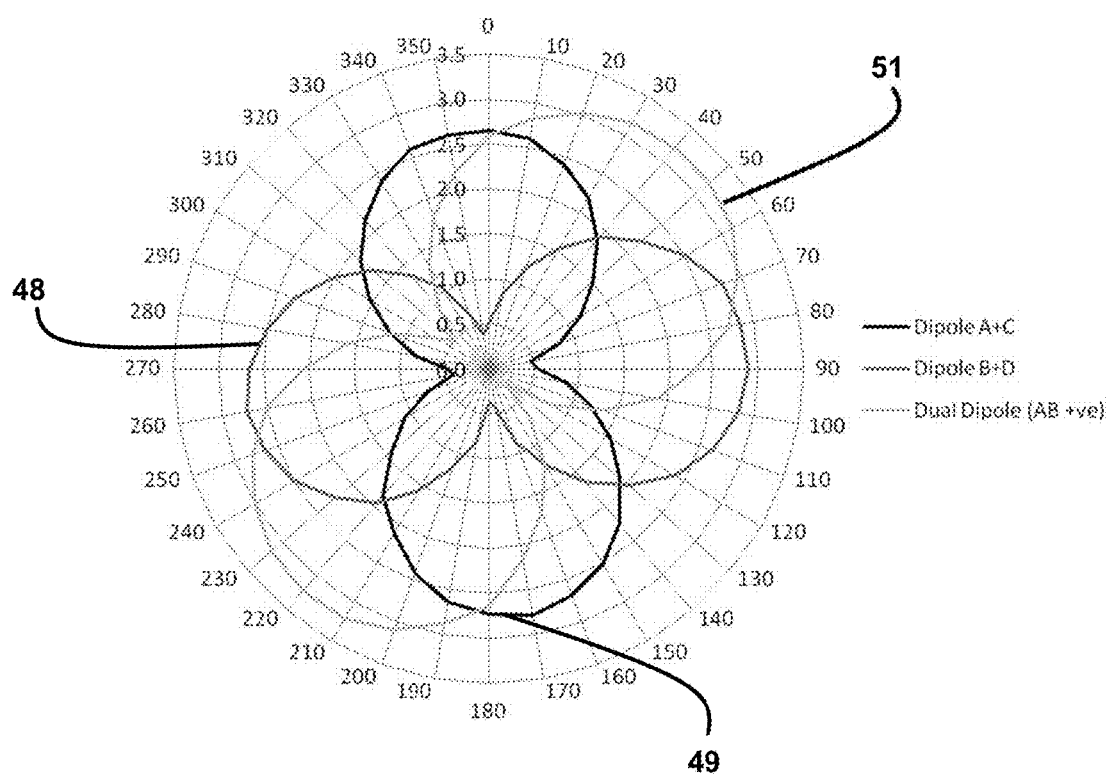
FIG. 9 is a similar plot to FIG. 6, showing the waves generated by the steps of FIGS. 7 and 8.

This results in generation of dipole wave 48 visible in FIG. 9. The poles of this dipole are in essence aligned with normals to the driven bender bars B and D.

A dipole wave the poles of which are rotated 90° to those represented by plot 48 may be generated by leaving bender bars B and D un-energised and instead causing flexing of the bender bars A and C in like manner to bender bars B and D in FIG. 7. This situation is represented by plot 49 in FIG. 9. Moreover the directions of flexing of the bender bars may selectively be reversed compared with the directions illustrated, by reversing the polarity of the applied voltage in each case.

Figure 8A:
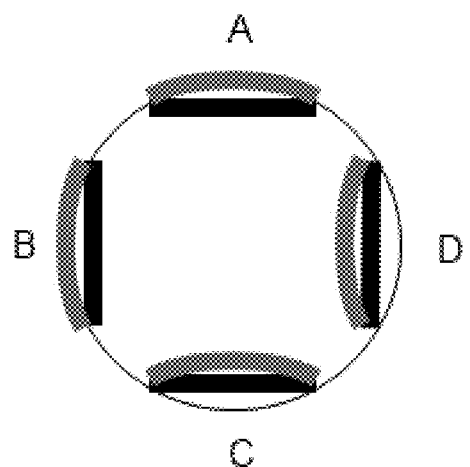
FIG. 8a is a view similar to FIG. 5 showing method steps that result in generation of a so-called "dual dipole" wave the poles of which are rotated 45° relative to those generated by the method of FIG. 7.
Figure 8B:
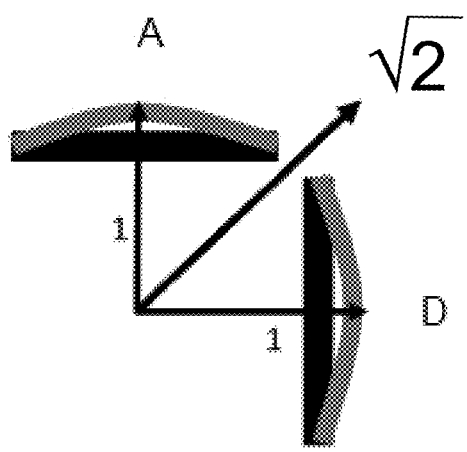
FIG. 8b is an enlargement of part of the FIG. 8a schematic drawing, illustrating an aspect of waveform generation.

FIGS. 8a, and 8b illustrate a further mode of driving that the inventors have identified. This is referred to herein as a "dual dipole" mode, and as noted has not been available using prior art logging tools and driver methods.

In this mode all four bender bars A, B, C and D are energised simultaneously with (in one embodiment of the method of the invention illustrated in FIG. 8a) bender bars A and B driven outwardly to the same extent relative to the transmitter and bender bars C and D driven inwardly to the same extent.

This results in generation of a dipole wave 51 (see FIG. 9) the pole axis is of which is rotated 45° relative to the axis of dipole wave 49. This is illustrated schematically by the resultant arrow 59 of FIG. 8b.

The dipole wave 51 of FIG. 9 can be rotated 90 degrees by driving elements A and D both to flex inwardly to the same extent at the same time as driving bender bars B and C outwardly. This is illustrated in FIG. 8b.

The inventors in addition have found that as a result of the independent driveability of the four bender bars it is possible to energise them differentially such that each is caused to flex inwardly or outwardly, as desired, to a chosen extent.

This can give rise to e.g. a dual dipole (as defined herein) pressure pattern the principal axis of which is rotationally offset, relative to conventional orthogonal x- and y-axes, to any desired extent depending on the voltages chosen for driving the bender bars.

Figure 10:
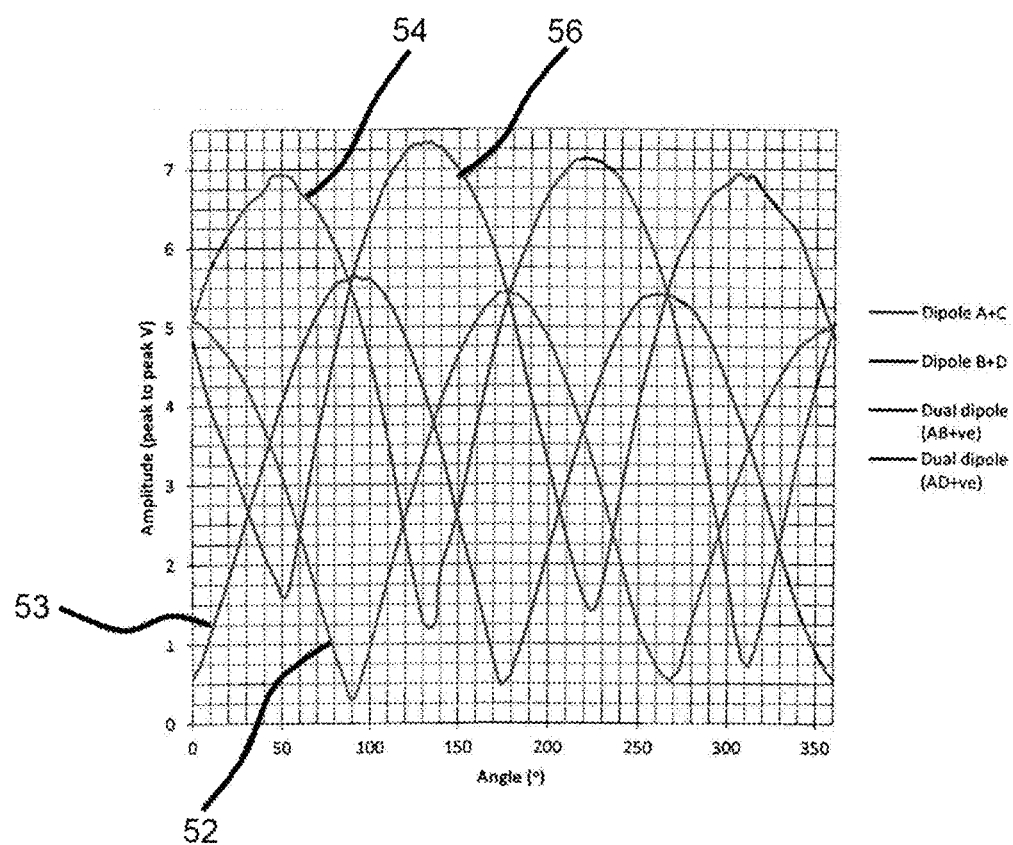
FIG. 10 shows some typical dipole and "dual dipole" pressure patterns that can be generated using the apparatuses and methods of the invention.

This effect is illustrated in FIG. 10, which is a plot of the amplitudes of the respective dipole and dual dipole modes against the polar angle measured in a clockwise direction starting from the positive y-axis as signified in e.g. FIG. 9.

Plot 52 in FIG. 10 shows the amplitude of a dipole pressure pattern generated by flexing bender bars A and C while leaving bender bars B and D unflexed. Plot 52 therefore corresponds to plot 49 in FIG. 9.

Similarly plot 53 in FIG. 10 represents the dipole pressure pattern 48 of FIG. 9, that is rotated 90° relative to dipole 49.

Two dual dipole pressure patterns 54 and 56 in FIG. 10 include amplitude peaks (dipole pattern lobes) that are rotated 45° relative to the orientations of dipoles 52, 53.

In more detail, plot 54 represents the dual dipole generated when bender bars A and B are driven to flex outwardly with bender bars C and D driven to flex inwardly, as illustrated in FIG. 8a; and plot 56 the dual dipole pressure pattern resulting from driving bender bars A and D to flex outwardly while bender bars B and C are driven inwardly, as illustrated in FIG. 8b.

By driving the bender bars differentially, i.e. so that they do not all flex to the same extent in order to generate pressure pulses it is possible to orientate the dual dipole axes so that they lie rotationally intermediate those illustrated in FIGS. 9 and 10. An example of this is illustrated in FIG. 13.

The inventors have found that by driving the bender bars of each pair driven outwardly or inwardly according to the driver voltage ratios 0:20; 10:20; 15:20; 20:20; 20:15; 20:10; and 20:0 respectively some particularly useful pressure patterns can be generated that are effective at exciting anisotropic formations, or in those conditions (e.g. eccentered tools in highly deviated boreholes) in which excess Stoneley wave excitation might be problematic and/or those in which the shear velocity is particularly problematic.

In the foregoing listing the ratio values correspond to the actual voltages applied to the bender bars of an acoustic logging transmitter. Thus for example a ratio of 0:20 implies that two of the bender bars were not energized while two more were energized by the application of a 20v potential (with the choices of the bender bars constituting each pair depending on the pressure pattern is it required to create). A ratio of (for example) 10:20 means that all four bender bars were energized, with the bender bars of one pair being subject to a 10v potential and the bender bars of the other pair a 20v potential. Such an energizing regime results in a dual dipole the poles of which are rotated about the plot origin visible in FIG. 9 by an amount intermediate the x- and y-axes.

Figure 13:
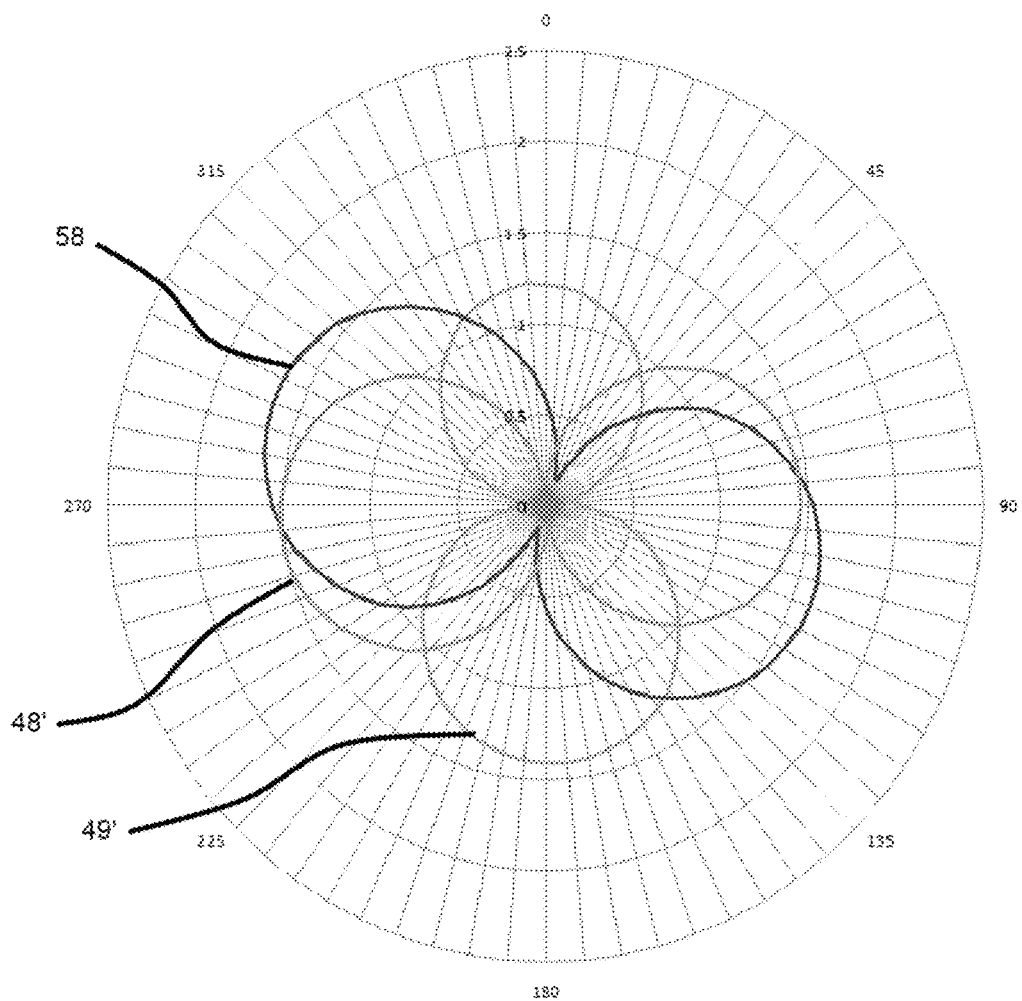
FIG. 13 is a similar plot to FIG. 9, showing among other things a further dual dipole pressure pattern according to the invention the pole axes of which are rotationally spaced from the x- and y-plot axes by an amount determined by the ratio of voltages applied to the piezoelectric plate(s) of a bender bar as described herein.

An example of such intermediate rotation is visible in FIG. 13. This shows plots 48' and 49' that aside from minor variations are similar to plots 48 and 49 of FIG. 9; and plot 58 that in essence is a variant on a mirror image of plot 51 of FIG. 9.

The pressure pattern represented by plot 58 has its principal axes rotated clockwise by 22½° relative to those of plot 48'. It is generated by driving bender bars B and D as shown in FIG. 8b with a driver voltage of 20v and bender bars A and C at 10v. The situation depicted by plot 58 therefore is illustrated of one of the seven preferred driver voltage ratios mentioned herein. As is evident plot 58 is indicative of a pole axis rotation relative to both the x- and y-axes of the borehole, and to the 45° axis position represented by plot 51 of FIG. 9.

In other embodiments of the invention other voltages can be applied, and the figures given above are intended to be merely representative of some of the many driving voltage combinations that are possible using the apparatus of the invention.

Furthermore the ability to "steer" the orientation of the poles of a dual dipole in this manner means that it is possible, by incrementally or continuously varying the voltages applied to the bender bars, to cause a dipole to rotate about the origin of the plots of e.g. FIG. 9. Appropriate programming of the driver circuit may be employed to achieve this effect. One way of making use of this ability to steer the dipole orientation is to cause rotation of the dipole axis until e.g. a maximal excitation value of a particular mode in the formation is detected. At this point the rotation can be halted and logging carried out with maximal energy efficiency.

Figure 2A:
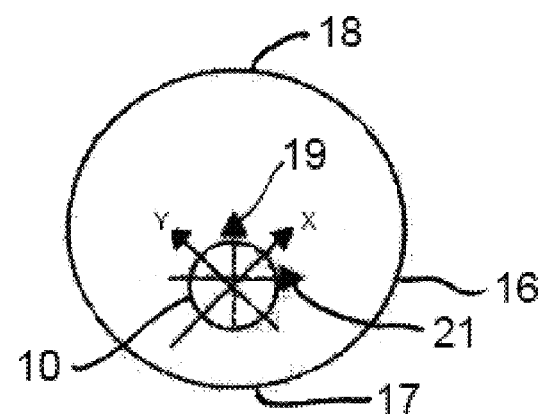
FIGS. 2a shows in schematic form the effects of eccentering of a logging tool in a borehole in which the tool axes are randomly aligned relative to the borehole axes.
Figure 2B:
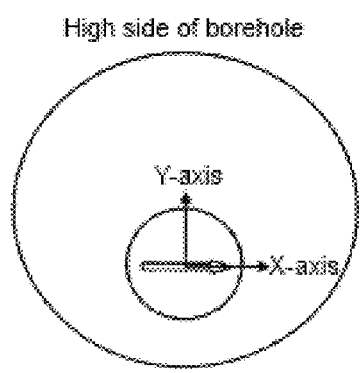
FIG. 2b shows in schematic form some advantages of the invention in a case of eccentering of a logging tool.

Such a technique can be used to solve the difficulty illustrated in FIG. 2a, by causing the poles of two steerable dual dipoles as defined to rotate until their principal axes are aligned respectively with the diameter and its chord as shown in FIG. 2b. Achievement of this effect may be detected by for example measuring the amplitude of energy coupled at the hydrophones of the logging tool.

Figure 11:
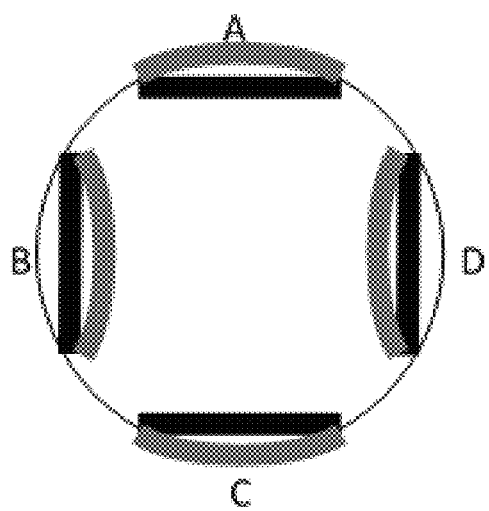
FIG. 11 is a view similar to FIG. 5 showing method steps that result in generation of a quadrupole wave.
Figure 12:
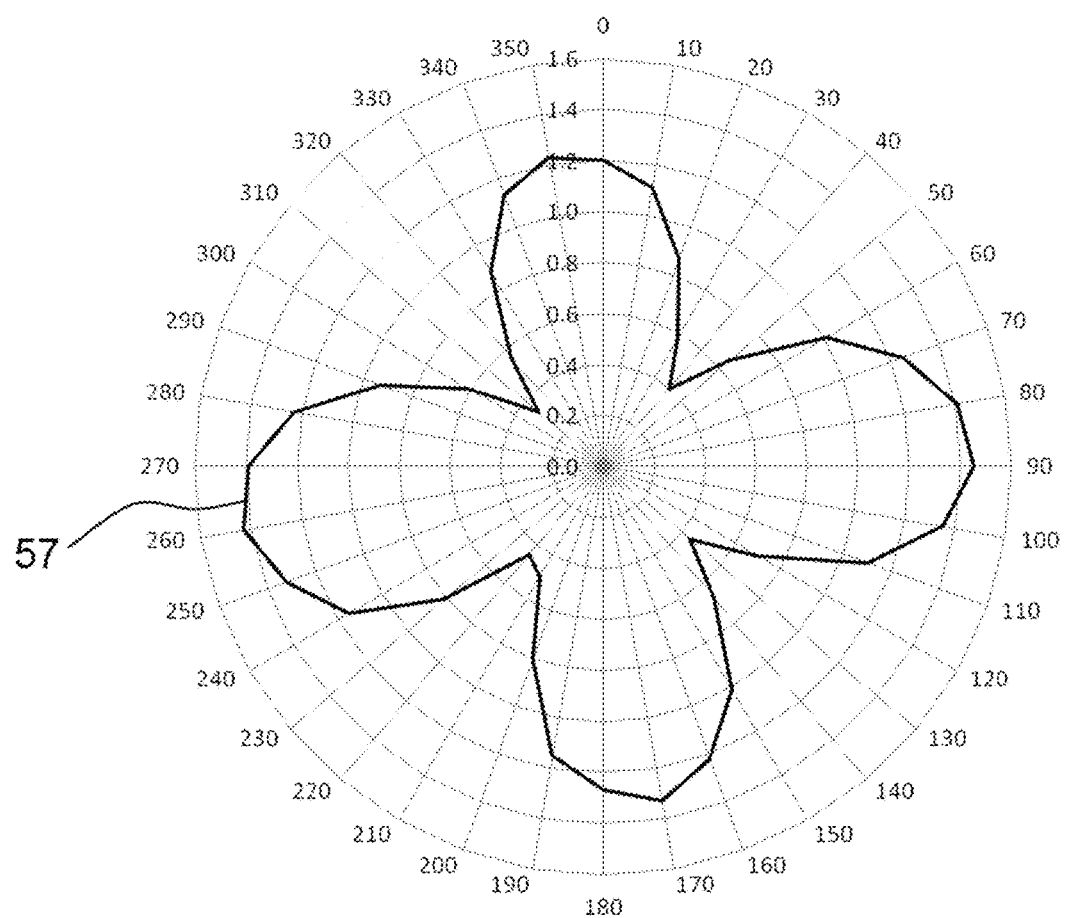
FIG. 12 is a similar plot to FIG. 6, showing the waves generated by the steps of FIG. 11.

FIG. 11 illustrates the pattern of bender bar driving needed to generate a quadrupole wave 57 as plotted in FIG. 12. In FIG. 10 bender bars A and C are driven to flex outwardly and bars B and D are driven to flex inwardly.

The poles of the quadrupole may be rotated 90° by reversing the bender bar driver polarities, in like manner to the other polarity reversal techniques described herein.

As a result of the method of the invention, that is used in the transmitter of the invention, it is possible without increasing the number of hydrophones and using only four depth-co-located bender bars to produce a large number of monopole, dipole and quadrupole waves. As a result significantly more data may be generated from an acoustic logging tool than has previously been available.

The listing or discussion of an apparently prior-published document in this specification should not necessarily be taken as an acknowledgement that the document is part of the state of the art or is common general knowledge.

What is claimed is:

1. A transmitter for an acoustic logging tool, the transmitter comprising:
   a housing defining a hollow, incompressible fluid-filled interior and supporting an acoustic energy generator,
   the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use,
   the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver.

2. The transmitter of claim 1 configured to generate monopole, dipole or quadrupole pressure patterns in said fluid.

3. The transmitter of claim 2 further configured to cause the poles of the dipole or quadrupole pressure patterns to be rotated at plus or minus 45° to normals to oppositely disposed pairs of the bender bars.

4. The transmitter of claim 1 wherein the housing is elongate; wherein the or each said transmissive window is elongate; and wherein the direction of elongation of the or each transmissive window is aligned with the direction of elongation of the housing.

5. The transmitter of claim 1 including four transmissive windows each respectively in register with said bender bar.

6. The transmitter of claim 1 wherein each bender bar includes a pair of elongate piezoelectric plates extending respectively along and secured to opposite sides of a hinge plate, the hinge plate extending beyond the piezoelectric plates in the direction of elongation thereof and being secured beyond the piezoelectric plates to opposed edges of said transmissive window.

7. The transmitter of claim 6 wherein each bender bar includes a pair of elongate piezoelectric plates extending respectively along and secured to opposite sides of a hinge plate, the hinge plate extending beyond the piezoelectric plates in the direction of elongation thereof and being secured beyond the piezoelectric plates to opposed edges of said transmissive window; and wherein the piezoelectric plates of each bender bar are identical to one another and are secured in register with one another on opposite sides of said hinge plate.

8. The transmitter of claim 1 wherein the bender bars define a square pattern when the transmitter is viewed in transverse cross-section.

9. The transmitter of claim 1 including secured at each end of the housing an end cap, wherein said end cap that in use lies uphole of the acoustic energy generator includes secured thereto an acoustic isolator.

10. The transmitter of claim 1 including secured at each end of the housing an end cap, wherein said end cap that in use lies uphole of the acoustic energy generator includes secured thereto an acoustic isolator; and including overlying the or each transmissive window a sealing sleeve that permits the transmission of acoustic energy externally of the transmitter and fluidically isolates the interior of the housing and the internal recesses from the exterior of the transmitter.

11. The transmitter of claim 1 including one or more programmable devices forming part of or operatively connected to the driver whereby to control the waveform generated in use of the transmitter.

12. The transmitter according of claim 1 wherein the housing is elongate and includes at least four bender bars that are co-located relative to the length of the housing.

13. An elongate logging toolstring comprising:
a transmitter secured therein, the transmitter comprising:
a housing defining a hollow, incompressible fluid-filled interior and supporting an acoustic energy generator,
the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use,
the housing including one or more transmissive windows via which flexing of the bender bars gives rise to propagation of one or more said pressure patterns in said fluid,
the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver; and
first and second opposing pairs of acoustic energy detectors, the first and second opposing pairs of the acoustic enemy detectors being orthogonal to each other, the acoustic energy detectors being spaced from the energy generator along the toolstring in an in-use uphole direction.

14. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:
operating the driver to cause simultaneous outward flexing of the four bender bars relative to the hollow interior of the housing in order to generate a monopole pressure pattern.

15. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of two said bender bars lying opposite one another in the transmitter on a first common axis, one said bender bar being flexed outwardly relative to the hollow interior of the housing and the other said bender bar being flexed inwardly relative to the hollow interior of the housing in order to generate a dipole pressure pattern the poles of which are aligned with the common axis.

16. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of two said bender bars lying opposite one another in the transmitter on a first common axis, one said bender bar being flexed outwardly relative to the hollow interior of the housing and the other said bender bar being flexed inwardly relative to the hollow interior of the housing in order to generate a dipole pressure pattern the poles of which are aligned with the common axis, wherein two said bender bars lying opposite one another in the transmitter on a second common axis that differs from the first common axis remain un-flexed during generation of the dipole wave.

17. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of a first pair of said bender bars lying opposite one another in the transmitter, one said bender bar of the first pair being flexed outwardly relative to the hollow interior of the housing and the other said bender bar of the first pair being flexed inwardly relative to the hollow interior of the housing and operating the driver to cause simultaneous flexing of a further pair of said bender bars lying opposite one another in the transmitter, one said bender bar of the further pair being flexed outwardly relative to the hollow interior of the housing and the other said bender bar of the further pair being flexed inwardly relative to the hollow interior of the housing, wherein the bender bars are each driven to flex to essentially the same extent in order to generate a dual dipole wave the poles of which are 45° out of phase with the common axes.

18. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of a first pair of said bender bars lying opposite one another in the transmitter, one said bender bar of the first pair being flexed outwardly relative to the hollow interior of the housing and the other said bender bar of the first pair being flexed inwardly relative to the hollow interior of the housing and operating the driver to cause simultaneous flexing of a further pair of said bender bars lying opposite one another in the transmitter on a second common axis, one said bender bar of the further pair being flexed outwardly relative to the hollow interior of the housing and the other said bender bar of the further pair being flexed inwardly relative to the hollow interior of the housing, wherein the bender bars of the first pair are driven to flex to essentially the same first extent and the bender bars of the second pair are driven to flex to essentially the same second extent that differs from the first extent in order to generate a dual dipole wave the poles of which are rotated relative to common axes interconnecting respectively the bender bars of the first pair and the bender bars of the second pair.

19. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of a first pair of said bender bars lying opposite one another in the transmitter, one said bender bar of the first pair being flexed outwardly relative to the hollow interior of the housing and the other said bender bar of the first pair being flexed inwardly relative to the hollow interior of the housing and operating the driver to cause simultaneous flexing of a further pair of said bender bars lying opposite one another in the transmitter on a second common axis, one said bender bar of the further pair being flexed outwardly relative to the hollow interior of the housing and the other said bender bar of the further pair being flexed inwardly relative to the hollow interior of the housing, wherein the bender bars of the first pair are driven to flex to essentially the same first extent and the bender bars of the second pair are driven to flex to essentially the same second extent that differs from the first extent in order to generate a dual dipole wave the poles of which are rotated relative to common axes interconnecting respectively the bender bars of the first pair and the bender bars of the second pair, wherein the driver causes flexing of the bender bars of the first pair to an extent relative to the extent to which the driver causes flexing of the bender bars of the second pair that is selected from the following ratios: 0:20; 10:20; 15:20; 20:20; 20:15; 20:10; 20:0.

20. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of a first pair of said bender bars lying opposite one another in the transmitter, one said bender bar of the first pair being flexed outwardly relative to the hollow interior of the housing and the other said bender bar of the first pair being flexed inwardly relative to the hollow interior of the housing and operating the driver to cause simultaneous flexing of a further pair of said bender bars lying opposite one another in the transmitter on a second common axis, one said bender bar of the further pair being flexed outwardly relative to the hollow interior of the housing and the other said bender bar of the further pair being flexed inwardly relative to the hollow interior of the housing, wherein the bender bars of the first pair are driven to flex to essentially the same first extent and the bender bars of the second pair are driven to flex to essentially the same second extent that differs from the first extent in order to generate a dual dipole wave the poles of which are rotated relative to common axes interconnecting respectively the bender bars of the first pair and the bender bars of the second pair, including the step of varying the ratio of the extent of flexing of the first pair of bender bars relative to the extent of flexing of the second pair of bender bars whereby to cause continuous adjustment of the degree of mis-alignment of the poles of the dipoles of a dual dipole pressure pattern (as defined herein).

21. A method of operating a transmitter, the transmitter comprising a housing defining a hollow, incompressible fluid-filled interior and supporting an acoustic energy generator, the acoustic energy generator including first and second opposing pairs of bender bars, the first and second pairs being orthogonal to each other, the bender bars being individually electrically driveable to flex within the hollow interior in order to generate pressure patterns in a fluid surrounding the transmitter in use, the housing including one or more transmissive windows via which flexing of the bender bars gives rise to propagation of one or more said pressure patterns in said fluid, the transmitter further comprising a driver that applies voltages to the bender bars in order independently electrically to drive them to flex so as selectively to generate monopole or multi-pole pressure patterns in said fluid, with the poles of the multi-pole pressure patterns when generated selectively being aligned with normals to oppositely disposed pairs of the bender bars, or rotated at angles thereto depending on the voltages applied to the bender bars by the driver, the method comprising:

operating the driver to cause simultaneous flexing of a first pair of said bender bars lying opposite one another in the transmitter, one said bender bar of the first pair being flexed outwardly relative to the hollow interior of the housing and the other said bender bar of the first pair being flexed inwardly relative to the hollow interior of the housing and operating the driver to cause simultaneous flexing of a second pair of said bender bars lying opposite one another in the transmitter on a second common axis, one said bender bar of the further pair being flexed outwardly relative to the hollow interior of the housing and the other said bender bar of the further pair being flexed inwardly relative to the hollow interior of the housing, wherein the bender bars of the first pair are driven to flex to essentially the same first extent and the bender bars of the second pair are driven to flex to essentially the same second extent that differs from the first extent in order to generate a dual dipole wave the poles of which are rotated relative to common axes interconnecting respectively the bender bars of the first pair and the bender bars of the second pair, wherein the driver causes flexing of the bender bars of the first pair to an extent relative to the extent to which the driver causes flexing of the bender bars of the second pair that is selected from the following ratios: 0:20; 10:20; 15:20; 20:20; 20:15; 20:10; 20:0, and wherein the values of the elements of the respective ratios correspond substantially to voltages applied by the driver to the bender bars of respectively the first and the second pair in eight different modes of operation of the transmitter or the logging toolstring as appropriate.

* * * * *